United States Patent
Caliskan et al.

(10) Patent No.: US 6,820,924 B2
(45) Date of Patent: Nov. 23, 2004

(54) METHOD OF IMPROVING IMPACT ABSORBING AND DEFORMATION CONTROL CHARACTERISTICS OF VEHICLE COMPONENTS

(75) Inventors: Ari Garo Caliskan, Ypsilanti, MI (US); Paul George Sanders, Milan, MI (US); Armando Mateo Joaquin, Rochester, MI (US); Matthew John Zaluzec, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,350

(22) Filed: Jan. 13, 2003

(65) Prior Publication Data

US 2004/0201256 A1 Oct. 14, 2004

(51) Int. Cl.$^7$ ............................................. B62D 25/00
(52) U.S. Cl. ................... 296/187.03; 293/133; 188/377
(58) Field of Search ..................... 148/639; 296/187.03, 296/187.09, 187.1; 293/133, 155; 188/377; 280/784

(56) References Cited

U.S. PATENT DOCUMENTS

| | | | | |
|---|---|---|---|---|
| 3,983,962 A | * | 10/1976 | Torke | 188/377 |
| 4,023,652 A | * | 5/1977 | Torke | 188/377 |
| 4,194,763 A | * | 3/1980 | Reidelbach et al. | 296/189 |
| 4,401,486 A | * | 8/1983 | Pusateri et al. | 148/570 |
| 5,431,445 A | * | 7/1995 | Wheatley | 296/189 |
| 5,487,795 A | * | 1/1996 | Kim et al. | 148/520 |
| 5,492,207 A | | 2/1996 | Clausen | |
| 5,527,404 A | | 6/1996 | Warren | |
| 5,961,752 A | | 10/1999 | Bergsma | |
| 5,972,134 A | * | 10/1999 | Buschsieweke et al. | 148/567 |
| 6,139,655 A | * | 10/2000 | Kowalski et al. | 148/508 |
| 6,299,226 B1 | * | 10/2001 | Kroning et al. | 293/120 |
| 6,364,355 B1 | * | 4/2002 | Starozhitsky et al. | 280/741 |

FOREIGN PATENT DOCUMENTS

JP 3666 * 1/1979 ................. 293/133

* cited by examiner

*Primary Examiner*—Dennis H. Pedder
(74) *Attorney, Agent, or Firm*—Raymond L. Coppiellie; Brooks Kushman P.C.

(57) ABSTRACT

A crush rail or other structural member of a vehicle is provided with crush triggers. The crush triggers are formed by heating localized areas of the crush rail or other part and allowing them to cool slowly to provide increased ductility and reduced strength in a localized region. The crush rail is designed to collapse in a series of convolutions in a regular and repeated pattern. Crush triggers may be provided on body pillars, steering columns, drive shafts, engine support cradles, and other parts of a vehicle. A plurality of crush triggers may be provided on a single structural member depending upon impact absorption requirements.

19 Claims, 3 Drawing Sheets

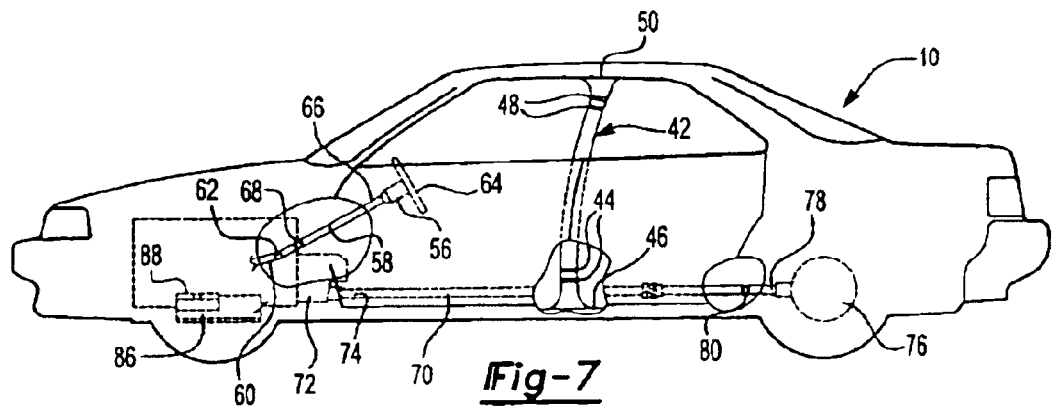
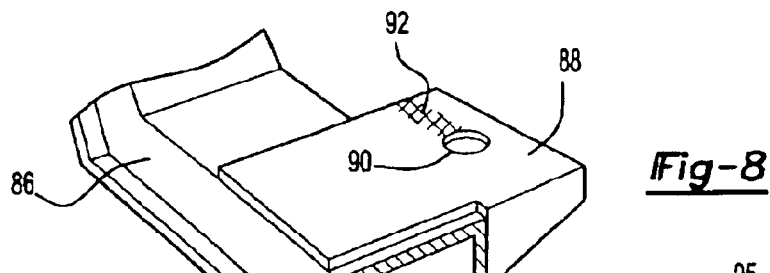
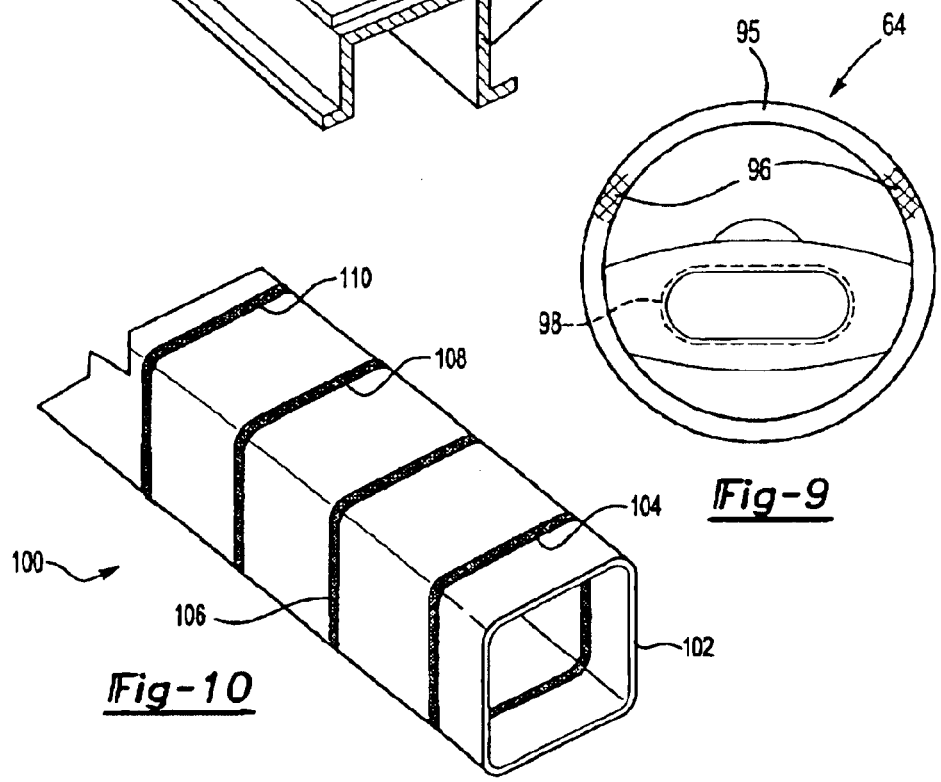

METHOD OF IMPROVING IMPACT ABSORBING AND DEFORMATION CONTROL CHARACTERISTICS OF VEHICLE COMPONENTS

BACKGROUND OF INVENTION

1. Field of the Invention

The present invention relates to a method of selectively modifying the physical characteristics of structural members to improve control of part deformation and enhance impact energy absorption.

2. Background Art

Certain structural components of vehicles are designed to improve crash worthiness of vehicles in the event of a collision. Impact energy absorption characteristics of vehicle parts are engineered to provide improved protection of vehicle occupants. For example, bumpers, bumper support brackets, steering columns, drive shafts and the like are designed, in part, to withstand the impact of a collision and absorb impact loads through material deformation.

It Is preferable that some vehicle parts bend in a controlled manner from the standpoint of improving impact energy absorption because bending the part allows a part to absorb more energy than if the part breaks or buckles in a single location. Passenger compartment pillars, steering wheels and engine mounts are parts that benefit from controlling deformation in the event of a collision.

Protective crumple zones and selectively weakened structural components are known to be enhanced by drilling, notching or otherwise reducing the cross-sectional area of component parts. Forming holes or slot to enhance the crush behavior structural components adds to tooling and manufacturing costs. When structural members are drilled, pierced or otherwise modified by conventional methods, stress risers are created and work hardening of the metal may lead to fatigue and tend to enhance the likelihood that a part will be susceptible to fatigue cracks and breakage. Providing holes or notches In impact absorbing members may also increase susceptibility to corrosion.

Another method of controlling crushing is to provide convolutions or ridges in an energy absorbing member. This alternative requires expensive manufacturing steps and does not facilitate the use of low-cost extruded parts.

Parts that are too strong are capable of transmitting higher loads and are not easily crushed to absorb impacts. Structural strength obtained by using high strength alloys of aluminum, steel and other metals permits reduction in the weight of component parts. However, increased strength of such parts causes them to become more susceptible to fracture and less capable of absorbing impact loads through deformation.

There is a need for a simple and Inexpensive method for improving the impact energy absorbing characteristics of structural vehicle parts. There is also a need for structural components made from high strength alloys that yield to impact forces in a controlled manner. A need also exists for flexible design alternatives that can be tuned for impact energy absorption and controlled deformation. Tuning the impact energy absorbing characteristics and deformation control characteristics of a part is not easily accomplished with prior art techniques and could only be provided with extensive tooling and complex manufacturing processes. Other characteristics that are important to improve include corrosion resistance, durability and improved noise, vibration and harshness.

The above problems and shortcomings of the prior art products and methods are addressed by applicants' invention as summarized below.

SUMMARY OF INVENTION

According to one aspect of the present invention, a crush rail having improved structural properties for Improving the crash worthiness of a vehicle is provided. The crush rail comprises an elongated rail made from metal that is provided with a crush trigger. The crush trigger is integrally formed on the rail and is a localized part of the elongated member that is heat treated to decrease the yield strength and increase the ductility of the metal. The localized part of the elongated member is spaced from an end of the rail.

According to other aspects of the invention, the crush trigger is heat treated by means of induction heating. The elongated rail may be made from aluminum, steel, or magnesium alloys.

According to another aspect of the invention, a bumper support bracket having improved crash worthiness is provided that comprises an elongated metal member with a rectangular cross section. The elongated member has a first end bolted to the frame of the automobile and a second end spaced from the frame. At least one crush trigger is formed by heat treating a localized area spaced from but near the second end of the elongated member. The crush trigger is an area of reduced yield strength and increased ductility.

According to other aspects of the invention as it relates to a bumper support, the elongated rail is made from a heat treatable metal alloy. The crush trigger may be heated circumferentially by various heating processes, for example, by induction heating. The crush trigger is created at a pre-determined distance from the free edge with the distance being determined as a function of the material characteristics, wall thickness and dimensions of the rectangular tube. The crush trigger is located to control the location and force required to initiate crush upon impact.

A plurality of crush triggers may be provided in addition to the first crush trigger with a distance between each crush trigger being substantially the same distance as the distance between the second end and the first crush trigger. The first crush trigger is preferably heat treated to obtain a particular yield strength and a particular ductility. Each subsequent crush trigger may have a relatively higher yield strength and relatively lower ductility than the crush trigger adjacent to the crush trigger in the direction of the second end.

According to another aspect of the invention, a body pillar assembly for a vehicle is provided. The body pillar includes an elongated pillar formed of a heat treatable alloy. The pillar has a bottom end attached to the chassis or compartment pan of the vehicle and a top end attached to the body of the vehicle at a point spaced above the chassis of the vehicle. At least one crush trigger is formed by heat treating a localized area of the pillar to locally reduce yield strength and increase ductility of the pillar.

According to other aspects of the invention, as they relate to body pillars of a vehicle, the crush trigger may be created by means of induction heating. For example, one crush trigger may be provided near a top end of the b-pillar and a second crush trigger may be provided proximate the bottom end of the b-pillar which is attached to the chassis or compartment pan.

According to another aspect of the invention, a steering column assembly of a vehicle having improved crash worthiness and steering rigidity is provided. The steering column assembly includes a steering column component made from a heat treatable tube having a circular cross section. The steering column component has a first end that is closest to the steering wheel and a second end that is closest to the steering gear. A crush trigger is created by locally heating an area of the heat treatable tube to decrease the yield strength and increase the ductility of the metal. The crush trigger is formed near the end of the heat treatable tube that is attached to the steering gear.

According to another aspect of the invention, a drive shaft for a rear wheel drive vehicle is provided. The drive shaft includes an elongated member made from heat treatable metal having a circular cross section. The drive shaft includes two ends with one end being attached to a transmission and the other end being attached to a rear differential assembly. A crush trigger is created by heat treating the metal to decrease the yield strength and increase the ductility of the metal. The crush trigger is formed near the end of the drive shaft that is connected to the rear differential assembly. The drive shaft may be made by an extrusion process.

According to another aspect of the invention, an engine support frame, or mount, is provided for improving the crash worthiness of a vehicle. The engine mount may be made of a heat treatable metal with a crush trigger being created by forming a hole in the engine mount and heat treating an area rearward of the hole in a localized area to reduce the yield strength and increase the ductility thereof. In the event of an impact that involves the engine, a fastener securing the engine to the engine mount can deform the localized area on the engine mount and elongate the hole that receives the fastener.

Another potential application of the invention is in the manufacture of steering wheels. By using the present invention a steering wheel can be made of a high strength alloy to obtain weight savings. The steering wheel would then be locally heat treated to reduce its strength around a portion of its periphery so that the wheel would deform in the event of a collision that would cause a driver's head to impact the wheel. Another advantage of this application is that the rigidity of the steering wheel is improved.

According to another aspect of the present invention, a crush rail is prepared from an elongated member made from a heat treatable metal having a first and a second end and intermediate portions between the first and second ends. A crush trigger is created by heat treating the elongated member with a continuously varied yield strength and ductility being provided along the length of the elongated member to provide progressively greater yield strength and reduced ductility from the first end to the second end of the elongated member. The yield strength and ductility are modified by heat treating different areas of the elongated member for different amounts of time. Yield strength and ductility may also be modified applied along the length of the elongated member by changing heat treat temperature or duration of heat treatment along the length of the elongated member. The first end is heat treated to have the lowest yield strength and the highest ductility while the second end has the highest yield and the lowest ductility with the yield strength of the intermediate portion of the elongated member varying continuously from the first end to the second end.

The above aspects of the different embodiments of the present invention and additional aspects will be better understood in view of the attached drawings and following detailed description of the various embodiments of the invention.

BRIEF DESCRIPTION OF DRAWINGS

FIG. 7 is a diagrammatic side elevation view of a vehicle having various parts formed with crush triggers according to the present invention;

FIG. 8 is a perspective view of an engine mount having crush triggers formed thereon;

FIG. 9 is an elevation view of a steering wheel having weakened portions on its perimeter; and FIG. 10 is a fragmentary perspective view of a crush rail having a series of crush triggers formed thereon.

DETAILED DESCRIPTION

Figure 1:
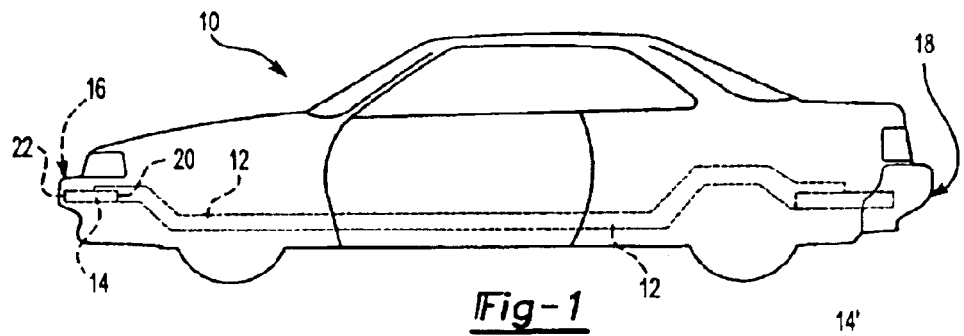
FIG. 1 is a side elevation view of a vehicle having a crush rail.

Referring now to FIG. 1, a vehicle 10 having a frame 12 is provided with a crush rail 14 that may be part of a bumper support bracket. The crush rail could alternatively be connected to a vehicle with a unibody type construction that does not have a separate frame. The crush rail 14 connects the frame 12 of the vehicle 10 to the front bumper 16. It should be readily appreciated that variations of the crush rail 14 may be provided in other locations in the vehicle 10 such as between the frame 12 and the rear bumper 18, or the like. The crush rail 14 includes a first end 20 that is connected to the frame 12 and a second end 22 that is connected directly or indirectly to the front bumper 16.

Figures 2, 2A:
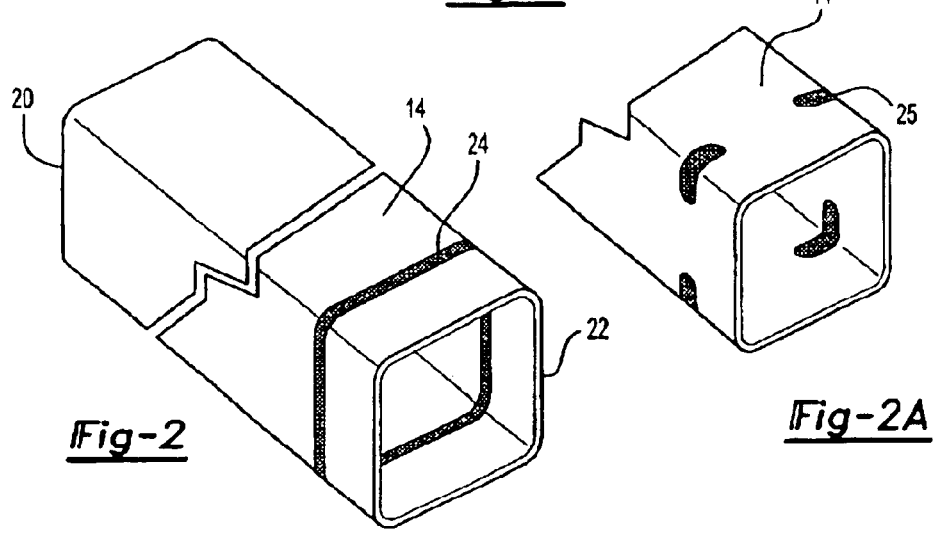
FIG. 2 is a perspective view of a rail having two crush triggers formed therein by locally heat treating a portion of the rail.
FIG. 2a is a perspective view of an alternative embodiment of a crush rail with only the corners of the rail being heat treated to form crush triggers.

Referring now to FIG. 2, a crush rail 14 is shown in isolation. One or more crush triggers 24 may be provided as represented by the cross hatched band. The crush trigger 24 is formed by locally heating the crush rail 14 and allowing it to cool. The rail 14 is preferably formed of a high strength aluminum alloy (such as 6XXX series alloy), steel alloy, or magnesium alloy. The crush rail is a heat treated member. Heat treating is provided to increase the strength of the crush rail. The crush trigger 24 is preferably formed by induction heating the rail at a point that is spaced from the second end 22 of the rail 14. Other methods of heating may be used to form the crush trigger such as a gas torch, electric radiant heat, or laser heating. After heating, the rail may be allowed to cool. In aluminum, the objective of the heat treatment is to overage the material to create a lower strength, stable microstructure that does not age harden after processing. This implies that solutionizing is not desired, and that the heat treatment temperature should be kept below single phase (alpha) region in the aluminum phase diagram. Depending on the alloy composition, the maximum temperature could range from 350° C. to 600° C.

Referring to FIG. 2a, an alternative embodiment of a crush rail 14' is shown wherein only the corners of the rail are heated to form a crush trigger 25. The crush trigger 25 may be formed by inductively or otherwise heating the corners. By reducing the strength and increasing the ductility of the corners it is thought that impact absorption performance can obtained that is similar to the embodiment of FIG. 2.

Figure 3:
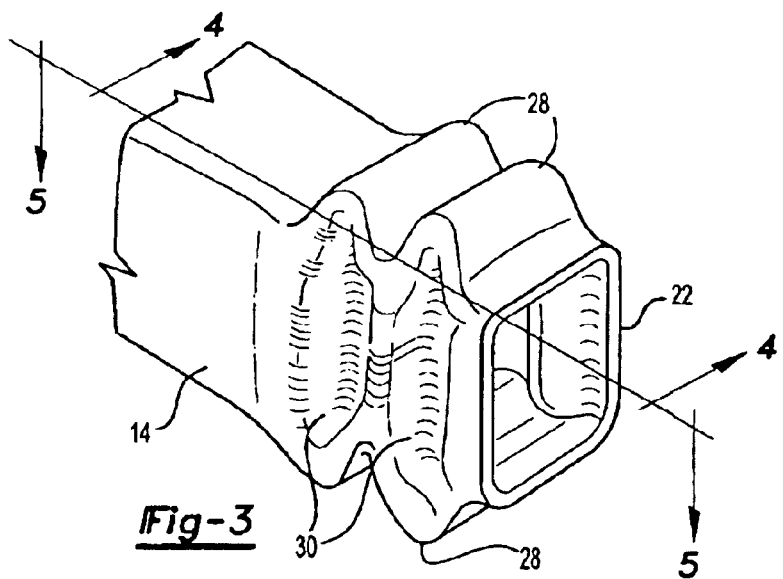
FIG. 3 is a perspective view showing the deformation of a crush rail similar to the rail shown in FIG. 2 after impact.
Figure 4:
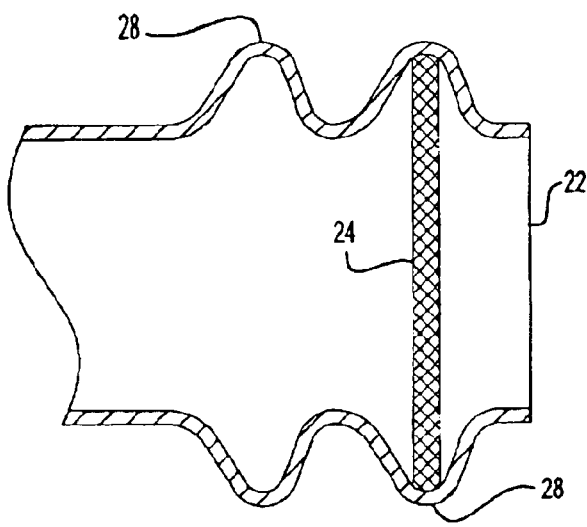
FIG. 4 is a cross-sectional view taken along the line 4—4 in FIG. 3.
Figure 5:
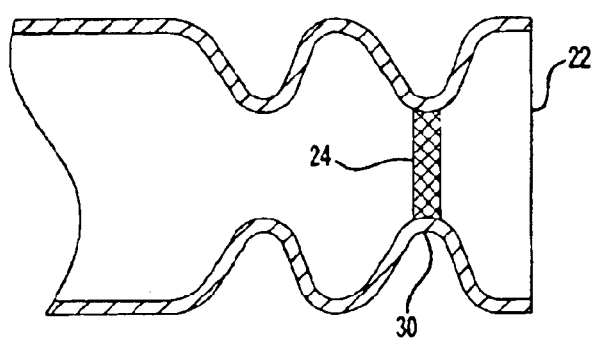
FIG. 5 is a cross-sectional view taken along the line 5—5 in FIG. 3.

Referring now to FIGS. 3-5, a crush rail 14 is shown after a simulated impact in a test fixture. The rail 14 is impacted at the second end 22 while it is held in a fixture (not shown). After impact, a series of outward convolutions 28 and inward convolutions 30 are formed in the area of the crush trigger 24. Once the convolutions begin forming, they tend to be replicated as the rail is further deformed. Even if only one crush trigger is provided, a series of two, three, or more convolutions may stack up as the crush rail 14 absorbs impact energy.

Figure 6:
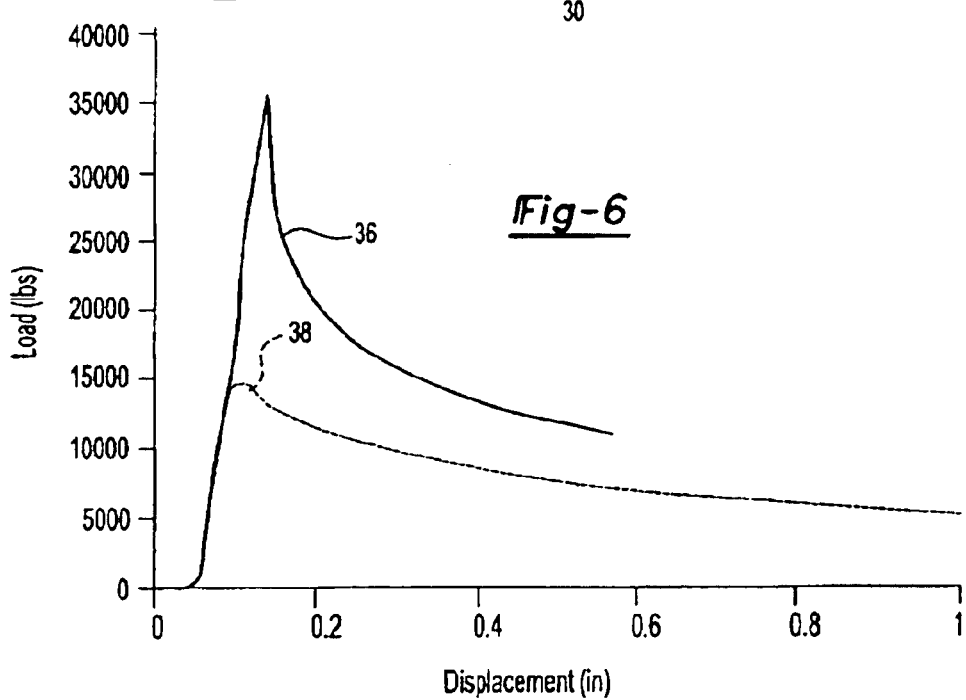
FIG. 6 is a graph showing the peak load of a untreated crush rail compared to the peak load transmitted by a crush rail having a crush trigger formed on the rail.

Referring now to FIG. 6, a graph comparing the peak load of a crush rail having no trigger represented by load line 36. Tests of a rail having a crush trigger is represented by line 38. The peak load transmitted in the test of the crush rail having no trigger yielded a peak load of about 35,000 lbs. In comparison, the crush rails having a crush trigger as shown in FIG. 2 yielded a peak load of about 15,000 lbs. Based upon this test it is apparent that the effect of potentially reducing the peak load by more than half that may dramatically reduce the force transmitted to a vehicle occupant in a collision as a result of superior impact energy absorption of the crush rail.

Referring now to FIG. 7, a vehicle 10 is shown that includes a crush trigger formed according to the present invention in a variety of structural body parts. The invention could also be applied to other vehicle parts. The vehicle 10 includes a body pillar assembly 42 that is commonly referred to as the B pillar. The body pillar 42 includes a lower crush trigger 44 near the chassis or compartment pan 46 of the vehicle 10. An upper crush trigger 48 may also be provided near the roof 50 of the vehicle. Crush triggers 44, 48 permit the body pillar assembly 42 to absorb impact energy in a controlled fashion. It is believed that the body pillar assembly 42 with crush triggers 44, 48 is more likely to bend at the top and bottom instead of the middle and thereby improve occupant protection.

The vehicle 10 also includes a steering column assembly 56. Steering column assembly 56 includes a steering column tube 58 that is attached to a steering gear 60 of the vehicle on a steering gear end 62. A steering wheel 64 is connected to the steering column assembly 56 at a steering wheel end 66 of the steering column tube 58. A crush trigger 68 is preferably formed near the steering gear end 62 of the steering column tube 58.

A drive shaft 70 is connected to the vehicle transmission 72. The drive shaft 70 includes a transmission end 74 that is connected to the transmission 72. A differential 76 is provided in a rear wheel drive vehicle with a differential end 78 of the drive shaft 70 being connected to the differential 76. A crush trigger 80 is preferably provided near the differential end 78 of the drive shaft 70.

Referring now to FIGS. 7 and 8, an engine support frame 86 is provided for an engine cradle or engine mount assembly 88 that is formed from a neat treatable alloy. A hole 90 is provided on the engine mount 88 through which a fastener may be inserted for mounting the engine. A local area 92 represented by cross-hatched lines rearward of the hole 90 is heated to reduce the strength of the engine mount locally and increase its ductility. As the engine mount in the local area becomes more ductile it will be more likely to deform or bend instead of breaking in the event of a collision.

Referring to FIG. 9, the steering wheel 64 is illustrated that is made from a heat treatable material. The steering wheel has two portions 96 of its periphery that are heated to reduce the strength and increase the ductility of the upper portion 95 of the wheel so that if a driver's head contacts the wheel 64 in an impact, the top portion 95 of the steering wheel 64 will bend to reduce the severity of the impact. By making the steering wheel 64 from a high strength alloy, the weight of the wheel may be reduced and the rigidity increased to improve noise, vibration and harshness performance. In addition, improved noise, vibration and harshness characteristics may be achieved.

Referring now to FIG. 10, an alternative embodiment of a crush rail 100 is provided that includes an end portion 102. A first trigger 104 is provided on the crush rail 100 near the end portion 102. Second, third and fourth triggers 106, 108, and 110 are provided at regularly or irregularly spaced intervals along crush rail 100. By providing multiple crush triggers, it may be possible to further tune the impact absorption capability of the crush rail 100. The degree of modification of the hardness of the crush triggers may be varied in a decreasing relationship by sequentially reducing the heat applied for each crush trigger. The crush rail could also be made with a section of continuously reduced ductility by progressively reducing the heat applied.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A crush rail having improved crash worthiness, comprising:
    an elongated rail made from metal; and
    a crush trigger integrally formed in the rail that comprises a localized part spaced from an end of the rail that is heat treated to decrease the yield strength and increase the ductility of the metal; and
    a series of outward convolutions and inward convolutions formed in an area of the crush trigger after impact, the outward convolutions rising above a top outer surface of the rail in a portion of the area and the inward convolutions sunken below a side outer surface in the same portion of the area as the outward convolutions such that a cross-section through the portion produces alternating inward and outward convolutions around the outer surfaces of the rail, the outer surfaces defined by the perimeter of the rail prior to impact.

2. The crush rail of claim 1 wherein the crush trigger is heat treated by means of induction heating.

3. The crush rail of claim 1 wherein the elongated rail is made from a magnesium alloy.

4. The crush rail of claim 1 wherein the elongated rail is made from a steel alloy.

5. The crush rail of claim 1 wherein the elongated rail is made from an aluminum alloy.

6. The crush rail of claim 1 wherein the crush trigger is created by heat treating the rail to create varied yield strength and ductility along the length of the rail.

7. The crush rail of claim 6 wherein varied yield strength and ductility is created by heat treating different areas of the rail for different amounts of time.

8. The crush rail of claim 6 wherein the varied yield strength and ductility is created by heat treating different areas of the rail at different temperatures.

9. The crush rail of claim 6 wherein a first end of the rail has the lowest yield strength and the highest ductility, and a second end of the rail has the highest yield strength and lowest ductility, and the yield strength of a middle portion of the rail varies, with the yield strength increasing and the ductility decreasing in the direction of the first end to the second end.

10. A bumper support bracket having improved crash worthiness, comprising:

an elongated metal member with a rectangular cross section;

at least one crush trigger made by heat treating a localized area proximate but spaced from the second end of the elongated metal member, the crush trigger comprising an area of reduced yield strength and increased ductility; and a series of outward convolutions and inward convolutions formed in an area of the crush trigger after impact, the outward convolutions rising above a top outer surface of the elongated member in a portion of the area and the inward convolutions sunken below a side outer surface in the same portion of the area as the outward convolutions such that a cross-section through the portion produces alternating inward and outward convolutions around the outer surfaces of the rail, the outer surfaces defined by the perimeter of the elongated member prior to impact.

11. The bumper support of claim 10 wherein the elongated metal member is made from a heat treatable metal alloy.

12. The bumper support of claim 10 wherein the crush trigger is heat treated by induction heating.

13. The bumper support of claim 10 wherein the crush trigger is heat treated circumferentially.

14. The bumper support of claim 10 wherein there are a plurality of crush triggers in addition to the first crush trigger, with the distance between each crush trigger being substantially the same distance as the distance between the second end and the first crush trigger.

15. The bumper support of claim 14 wherein the first crush trigger is heat treated to have a particular yield strength and a particular ductility, and each subsequent crush trigger from the first crush trigger has a relatively higher yield strength and a relatively lower ductility than the crush trigger adjacent to the crush trigger in the direction of the second end.

16. The crush rail of claim 1 wherein the localized heat treated part of the rail corresponds with corners of the rail, a portion between the heat treated corners having greater yield strength and less ductility relative to the heat treated corners.

17. The crush rail of claim 1 wherein the rail is a square, including four sides having four corresponding corners, the four corners heat treated.

18. The bumper support of claim 10 the localized heat treated part of the elongated member corresponds with corners of the elongated member, a portion between the heat treated corners having greater yield strength and less ductility relative to the heat treated corners.

19. The bumper support of claim 10 wherein the elongated member is a square, including four sides having four corresponding corners, the four corners heat treated.

* * * * *